United States Patent [19]

Iwashita et al.

[11] Patent Number: 5,371,412
[45] Date of Patent: Dec. 6, 1994

[54] CONTROL METHOD AND APPARATUS OF ENGINE FOR DRIVING GENERATOR

[75] Inventors: Yoshihiro Iwashita; Hirohumi Kubota; Shouji Katsumata; Takeshi Kotani, all of Shizuoka, Japan

[73] Assignee: Toyota Jidosha Kabushiki Kaisha, Toyota, Japan

[21] Appl. No.: 174,013

[22] Filed: Dec. 28, 1993

[30] Foreign Application Priority Data

Feb. 5, 1993 [JP] Japan .................. 5-018938

[51] Int. Cl.$^5$ .................. B60K 13/00; B60L 11/02; E02D 29/06
[52] U.S. Cl. .................. 290/1 R; 123/519; 123/520; 180/69.4; 180/197; 290/16; 290/40 R
[58] Field of Search ............... 123/519, 520; 180/69.4, 180/197; 290/1 R, 16, 40 R

[56] References Cited

U.S. PATENT DOCUMENTS

| | | | |
|---|---|---|---|
| 3,728,846 | 4/1973 | Nilsson | 123/519 |
| 3,874,471 | 4/1975 | Kloefkorn | 180/69.4 |
| 4,021,677 | 5/1977 | Rosen et al. | 290/1 R |
| 4,658,796 | 4/1987 | Yoshida et al. | 123/519 |
| 4,658,797 | 4/1987 | Brand | 123/520 |
| 4,727,955 | 3/1988 | Honda et al. | 123/519 |
| 5,033,574 | 7/1991 | Kushi et al. | 180/197 |
| 5,060,620 | 10/1991 | Oslapas | 123/519 |

*Primary Examiner*—A. D. Pellinen
*Assistant Examiner*—Robert Lloyd Hoover
*Attorney, Agent, or Firm*—Oblon, Spivak, McClelland, Maier & Neustadt

[57] ABSTRACT

A control method and apparatus of an engine for driving a generator. When a weight W of a charcoal canister is greater than a predetermined value $W_1$ and a vehicle runs, the engine is actuated. As the result of the actuation of the engine, when a gasoline vapor within a fuel tank is purged and the weight W of the charcoal canister is lower than a second predetermined value $W_2$, a vacuum switching valve for purging the canister is turned off and the engine is stopped. Even when the vehicle runs while a battery is frequently charged by an external charger, the occurrence of a certain amount of the fuel vapor which can not be caught and collected by the charcoal canister can be prevented and a low pollution vehicle can be obtained. In place of the vehicle running state, a vehicle running distance, or a vehicle running time can be used. In place of the predetermined value $W_2$, a fuel purge amount can be used.

18 Claims, 10 Drawing Sheets

CONTROL METHOD AND APPARATUS OF ENGINE FOR DRIVING GENERATOR

BACKGROUND OF THE INVENTION

1. Field of the Invention

The present invention relates to an electric vehicle mounted with an engine activated generator, and more particularly to a control method and apparatus of its engine.

2.

Description of the Related Arts

An electric vehicle is a vehicle driven by an electric motor. In the electric vehicle, the motor is rotated by means of an electric power supplied from a battery mounted on the vehicle and generates a driving force of the vehicle. As a power source of the motor, in addition to the battery mounted on the vehicle, a so-called engine activated generator can be used.

The engine activated generator is an apparatus comprising an engine and a generator mechanically driven by the output of the engine. The output power of the generator is used for driving the motor and for other purposes such as charging the battery. As described above, in the electric vehicle, the power is supplied from the engine activated generator to the motor to drive the vehicle, and such an electric vehicle is called a series hybrid vehicle (SHV).

The electric vehicle is a low environmental pollution vehicle in comparison with a vehicle driven by only an internal combustion engine such as a gasoline engine. That is, an electric vehicle mounted with no engine basically discharges no exhaust gas and, though the SHV is the electric vehicle mounted with the engine, the SHV operates the engine less frequently than the gasoline engine vehicle and thus discharges less exhaust gas.

For example, the SHV can be used as means for extending a running range of an electric vehicle having these advantages, that is, a range extender. When the vehicle is run by supplying the power to the motor from only the battery mounted on the vehicle, the battery is discharged and the state of charge (SOC) is dropped. The remarkable drop of the SOC shortens a life of the battery and hence usually the battery is charged at a proper frequency by using a suitable means. In an electric vehicle having no engine activated generator, it is required to carry out the charging by using an off-board charger. However, in an electric vehicle having an engine activated generator, the charging of the battery can be performed by using the output power of the engine activated generator in addition to using the off-board charger. Hence, in the case of the vehicle such as the SHV, the driving of the vehicle can be continued without executing the charging operation by the off-board charger.

For example, a conventional battery charging means using an engine activated generator mounted on an electric vehicle has been proposed, as disclosed in Japanese Patent Laid-Open No. Sho 55-157901. In this case, in response to a detection of the drop of the SOC of the battery, the engine activated generator is driven for charging the battery, and, when the battery is fully charged (SOC=100%) as a result of the charging, the engine activated generator is stopped. As disclosed in this document, conventionally, it is possible to use the engine activated generator as the charging means of the battery.

However, when the electric vehicle having the engine activated generator is driven, the engine activated generator may not be activated for a long time according to the preference or intention of a driver. That is, when the driver frequently carries out the battery charging by using the off-board charger so as to always keep the SOC of the battery in a good state, the frequency of operation of the engine activated generator can be reduced. For instance, when the battery charging by using the external power is lower in cost than the driving of the engine activated generator, there is a high motive for carrying out the charging by the external charger. Further, a driver having a firm faith in restricting production of the exhaust gas does not mind taking the trouble to do such a frequent battery charging operation.

When the engine activated generator is often not operated for a long time, a large a amount of fuel vapor is produced in an engine constituting the engine activated generator. For example, in an gasoline engine, a large quantity of gasoline vapor is caused in a gasoline tank. When the amount of vapor exceed an amount which is catchable by a charcoal canister, this vapor will be discharged to the atmosphere and this is counter productive to the primary purpose of the electric vehicle, namely realizing a low environmental pollution.

SUMMARY OF THE INVENTION

It is therefore a first object of the present invention to provide an engine control method and apparatus, free from the aforementioned problems of the prior art, which is capable of controlling an engine of an engine activated generator so as to prevent a fuel vapor from discharging to the atmosphere even in the ease of frequent charging of a battery by using an off-board charger.

It is a second object of the present invention to provide an engine control method and apparatus which is capable of operating a warming up of an engine and simultaneously preventing a function drop of a lubricating oil due to an increase of a water component or an alcohol component.

It is a third object of the present invention to provide an engine control method and apparatus which is capable of suitably informing a driver or the like in a vehicle of an engine state.

It is a fourth object of the present invention to provide an engine control method and apparatus which is capable of properly achieving the above-described objects regardless of weight variations of a charcoal canister vessel.

A method according to the present invention is a method of controlling an engine for driving a generator, which comprises:

a) detecting an amount of fuel vapor within a fuel tank in a stopped state of the engine;

b) starting a loaded operation of the engine by using fuel stored within the fuel tank when the detected amount of fuel vapor in the stopped state of the engine is over a first predetermined value;

c) detecting an amount of fuel vapor within the fuel tank in an operated state of the engine; and d) stopping the engine when the detected amount of fuel vapor in the operated state of the engine is at most a second predetermined value which is smaller than the first predetermined value.

An apparatus according to the present invention is an apparatus of controlling an engine for driving a generator, which comprises:
  a) means for detecting an amount of fuel vapor within a fuel tank in a stopped state of the engine;
  b) means for starting a loaded operation of the engine by using fuel stored within the fuel tank when the detected amount of fuel vapor in the stopped state of the engine is over a first predetermined value;
  c) means for detecting an amount of fuel vapor within the fuel tank in an operated state of the engine; and
  d) means for stopping the engine when the detected amount of fuel vapor in the operated state of the engine is at most a second predetermined value which is smaller than the first predetermined value.

In the present invention, first, in the stopped state of the engine, the fuel vapor amount within the fuel tank is detected. Next, the detected vapor amount is compared with the first predetermined value. As a result of this comparison, when the vapor amount is greater than the first predetermined value, a large quantity of fuel vapor can be considered to be present within the fuel tank. In such a state, a controller actuates the engine. When the engine is moved to the loaded operation, the fuel vapor amount within the fuel tank is reduced. This vapor amount reduction is detected by comparing the detected value of the fuel vapor amount within the fuel tank with the second predetermined value and accordingly the engine is stopped. The second predetermined value is determined to be smaller than the first predetermined value. By such an operation, even in the case of a long unoperated state of the engine constituting an engine activated generator and in the case of the vehicle running, the fuel vapor amount within the fuel tank can be restricted and the discharging of this vapor to the atmosphere can be prevented. Also, a warm up of the engine is executed and a function drop of a lubricating oil due to an increase of a water component or an alcohol component can be prevented.

Further, in the present invention, the engine as the object to be controlled is typically mounted on an electric vehicle. The electric vehicle is a vehicle driven by a motor and in which the generator converts the input from the engine into electric power and supplies the obtained power to the motor for driving the motor. Also, the electric vehicle usually includes the battery. The battery supplies the power to the motor. Further, the battery is charged by the electric power generated by the generator. In the vehicle of this kind, the carrying out of the present invention leads to the realization of a low pollution electric vehicle.

When the engine as the object to be controlled in the present invention is mounted on the vehicle, it is preferable to start the loaded operation of the engine under the condition that the vehicle runs or the vehicle is in the runnable state. That is, it is preferable to stop the engine when the vehicle is stopped. By executing the engine actuation in such a state of the vehicle, the driver can properly recognize the operation situation of the engine and, even when trouble occurs in the engine, the driver or the like can exactly deal with this trouble. Hence, the engine start is informed to the driver prior to the start of the loaded operation of the engine.

In this case, the running of the vehicle can be ascertained by the detection and discrimination of the vehicle speed or the like. Also, the runnable state of the vehicle can be ascertained by observing a seated state of the driver on a driver's seat. Of course, the loaded operation of the engine can be executed at a fixed period without such observations.

The fuel vapor amount within the fuel tank can be detected as the weight of the charcoal canister for catching and collecting the fuel vapor within the fuel tank. Also, when the engine is in the loaded operation state, the fuel vapor amount can be calculated from an intake air amount A, a fuel injection amount $F_{inj}$ and a target A/F. That is, in the state of the target control of the ratio A/F between the intake air amount A and the fuel amount F supplied to the engine, by dividing the intake air amount A obtained by the detection by the target A/F, the fuel amount F supplied to the engine can be obtained. This fuel amount F is the sum of the fuel injection amount $F_{inj}$ and the fuel amount $F_P$ purged from the fuel tank to the air intake system and led to the engine. Since the fuel injection amount $F_{inj}$ is known, by subtracting the fuel injection amount $F_{inj}$ from the obtained fuel amount F, the purge amount $F_P$ can be obtained. Since the purge amount $F_P$ is the amount corresponding to the fuel vapor amount within the fuel tank, in the loaded operation state of the engine and in the state of the A/F controlling, the fuel vapor amount within the fuel tank can be obtained from the intake air amount A, the fuel injection amount $F_{inj}$ and the target A/F.

The purging of the fuel vapor from the fuel tank can be realized by providing a predetermined number of purge paths for purging the fuel from the fuel tank to the air intake system. As the purge paths of this kind, a first purge path for purging the fuel when a pressure difference between the fuel tank and the air intake system is large and a second purge path for purging the fuel according to a control signal can be given. The above-described A/F control can be executed by using the second purge path.

In the present invention, it is preferable to maintain an idle state till the start of the A/F control without immediately moving to the loaded operation state of the engine after the detected vapor amount is greater than the first predetermined value. Further, it is preferable to execute the loaded operation only when there is a generating request to the generator. For example, it is preferable to execute the loaded operation upon a poor SOC of the battery mounted on the vehicle. In this manner, the operation frequency of the engine can be restricted.

Further, by executing the loaded operation of the engine in a period until the engine is stopped after the detected fuel vapor amount is at most the second predetermined value, an error due to a variation of a weight of the charcoal containing canister can be absorbed.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
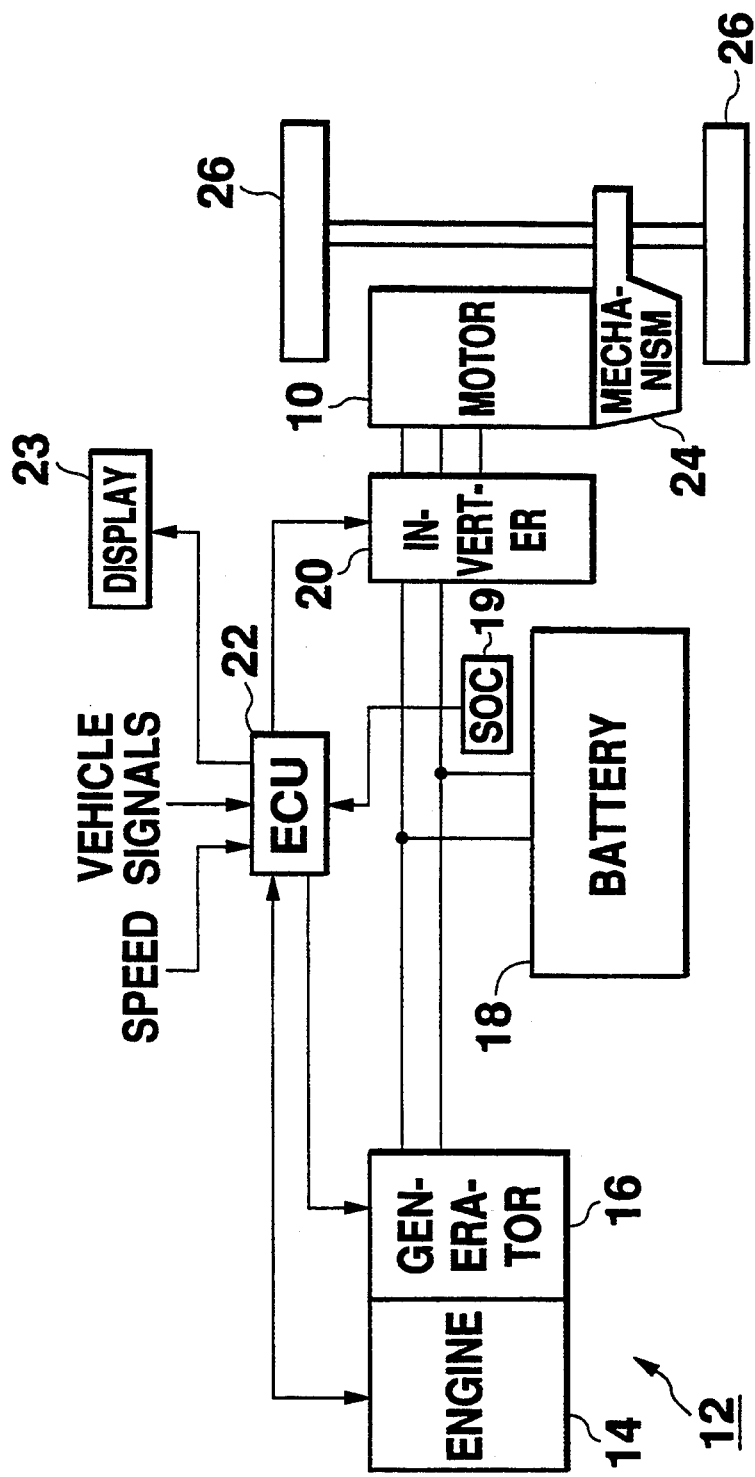
FIG. 1 is a block diagram of a system construction of a series hybrid vehicle (SHV) according to the present invention.

The present invention will now be described in connection with its preferred embodiments with reference to the accompanying drawings, wherein like reference characters designate like or corresponding parts throughout the views and thus the repeated description thereof can be omitted for brevity.

System Construction

In FIG. 1, there is shown a system construction of a series hybrid vehicle (SHV) according to the present invention. As shown in FIG. 1, the SHV is provided with a motor 10 and an engine activated generator 12. The engine activated generator 12 is constituted by an engine 14 and a generator 16. An output shaft of the engine 14 is coupled with an input shaft of the generator 16 via a mechanism such as a speed increasing unit or the like (not shown). The generator 16 generates electricity depending on the revolution of the engine 14 and outputs the electric power to a battery 18 and an inverter 20. When the generator 16 is an AC generator, a rectifier (not shown) is provided on the rear stage of the generator 16.

The inverter 20 converts the DC electric power supplied from the generator 16 or the battery 18 in the AC electric power under the control of an ECU (electronic control unit) 22 and supplies the AC electric power to the motor 10. The inverter 20 is composed of a predetermined number of switching elements and the ECU 22 controls the switching operation of these switching elements on the basis of vehicle signals representing an accelerator operation, a brake operation and the like. Hence, the effective value of the AC current supplied from the inverter 20 to the motor 10 is varied and the output torque of the motor 10 becomes a value corresponding to the vehicle signals. The mechanical output of the motor 10 is linked with driving wheels 26 via a mechanism 24 shown in FIG. 1. That is, the mechanical output of the motor 10 becomes the driving source of the vehicle.

The ECU 22 controls not only the inverter 20 but also the operations of the engine 14 and the generator 16. For example, while inputting a specific volume of intake air and a revolution number from the engine 14, the ECU 22 controls a throttle angle of the engine 14 and a field current of the generator 16. Also, the ECU 22 inputs a vehicle speed from a speed sensor (not shown) and instructs a warning display on a display device 23 within the vehicle as required. The ECU 22 inputs a signal representing whether the driver is seated at a driver's seat as one of the vehicle signals. Further, the ECU 22 detects the SOC (state of charge) of the battery 18 by means of an SOC sensor 19 attached to the battery 18.

Object to Be Controlled in Each Embodiment

Figure 2:
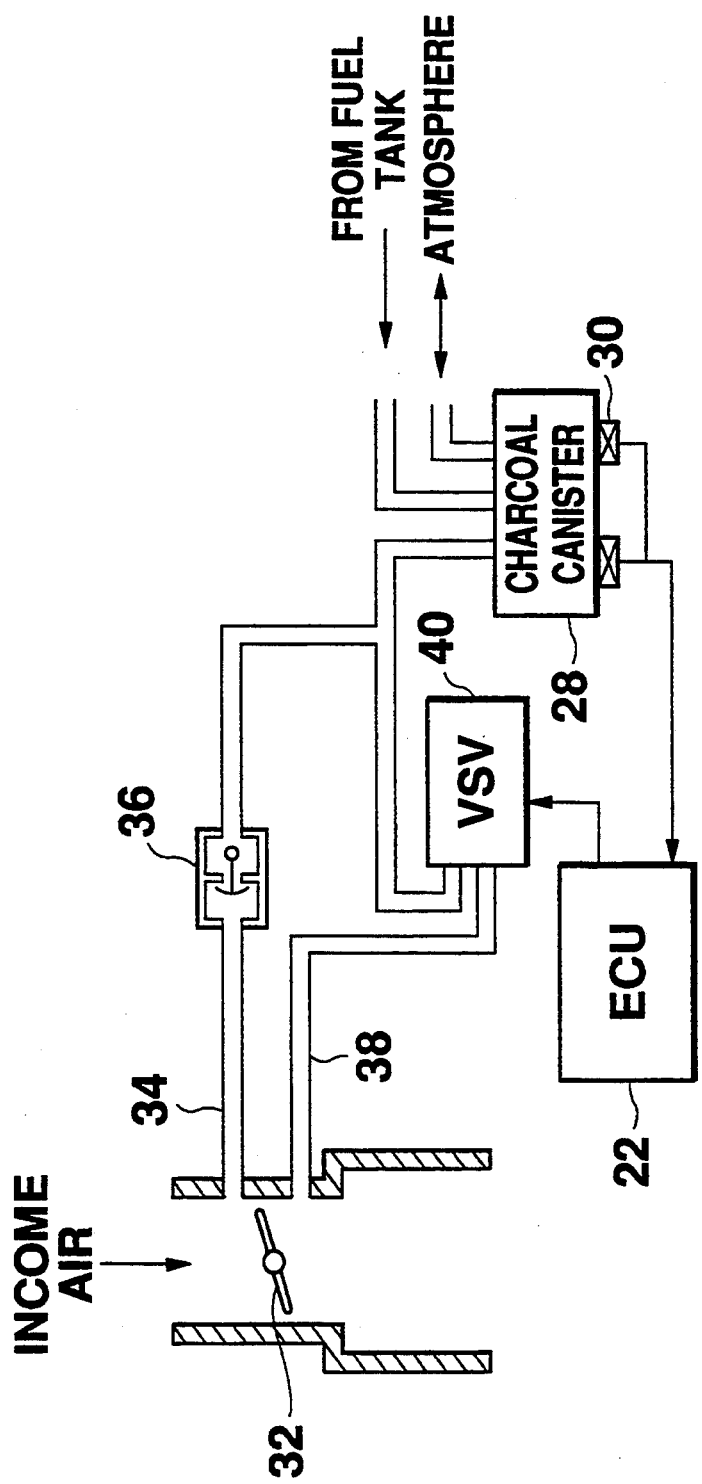
FIG. 2 is a schematic view showing one embodiment of a fuel vapor purging device used in the series hybrid vehicle shown in FIG. 1.

The engine 14 which is the object to be controlled by the ECU 22 is formed with a fuel vapor purging device, as shown in FIG. 2. This fuel vapor purging device includes a charcoal canister 28 containing active carbon so as to catch and collect gasoline vapor within a fuel tank. The charcoal canister 28 is attached with load cells 30 for detecting the weight W of the charcoal canister 28. The outputs of the load cells 30 are fed to the ECU 22 as the information representing the weight W of the charcoal canister 28.

A purge port 34 is formed on an air intake system on the upstream side of a throttle valve 32 and is connected to the charcoal canister 28 via a check valve 36. When a pressure difference between the front and rear sides of the check valve 36 reaches a predetermined valve opening value, the check valve 36 opens to form a purge path of the gasoline vapor from the charcoal canister 28 to the air intake system via the check valve 36.

Also, another purge port 38 is formed on the air intake system on the downstream side of the throttle valve 32 and is connected to the charcoal canister 28 via a VSV (vacuum switching valve) 40 for purge control. A valve opening duty of the VSV 40 is controlled by a duty ratio of a signal supplied from the ECU 22. By this control, the purge path from the charcoal canister 28 to the air intake system via the VSV 40 is made and a purge amount of the gasoline vapor is controlled.

The First Embodiment

Figure 3:
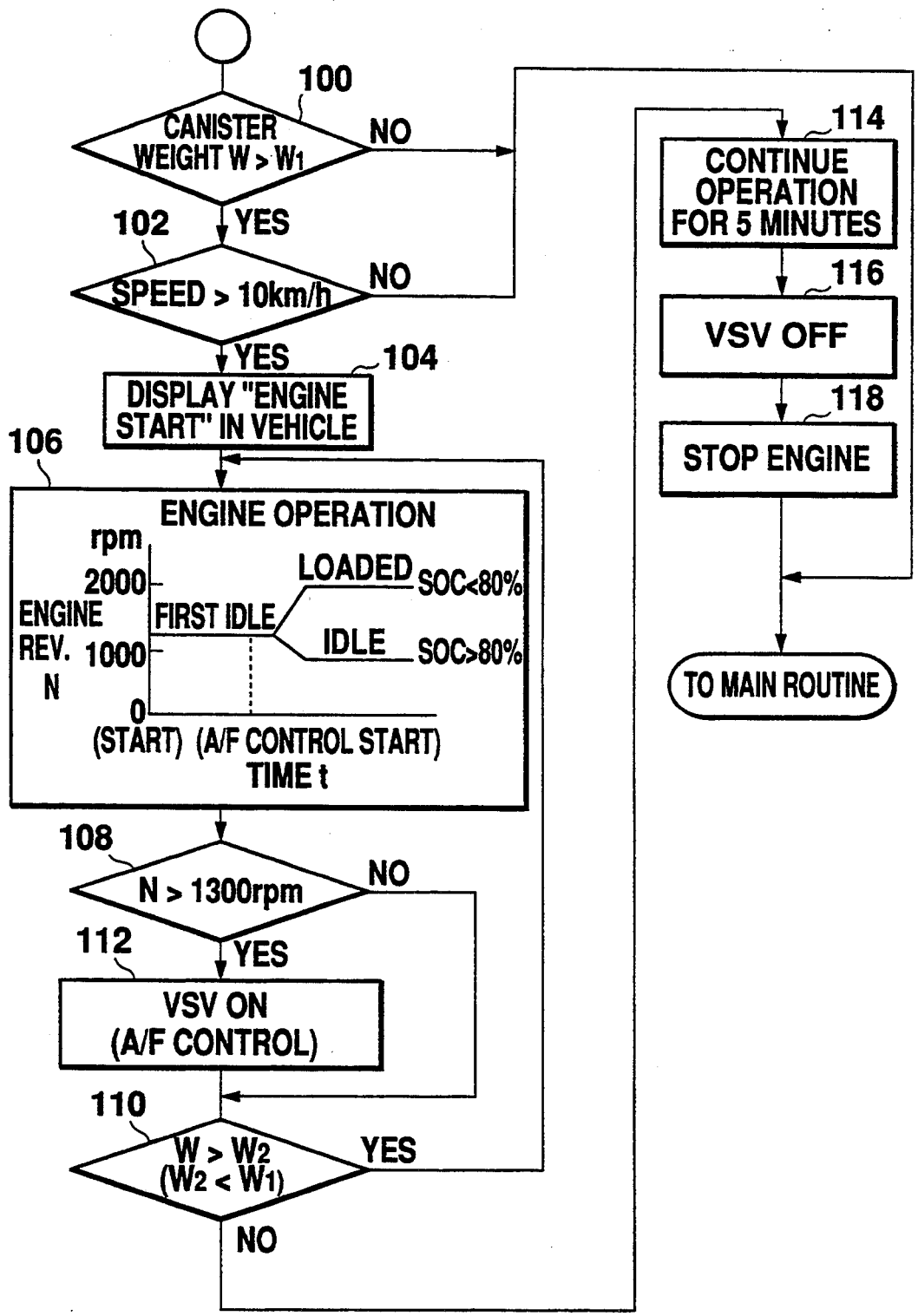
FIGS. 3 to 10 are flow charts showing an operation of an electronic control unit (ECU) of the vehicle shown in FIG. 1 in the first to the eighth embodiments according to the present invention.

FIG. 3 illustrates a flow of an operation of the first embodiment of an engine control apparatus according to the present invention. The operation shown in FIG. 3 is a flow of a controller of the operation of the engine 14, that is, the operation of the ECU 22 shown in FIGS. 1 and 2. The routine shown in FIG. 3 is a purge control routine of the gasoline vapor, which is repeatedly executed within a main routine (not shown).

As shown in FIG. 3, first, the ECU 22 discriminates whether or not the weight W of the charcoal canister 28 is over a predetermined value $W_1$ on the basis of the outputs of the load cells 30 in step 100. That is, it is discriminated whether or not the gasoline vapor within the gasoline tank is greater than the predetermined amount. As a result of this discrimination, when it has been discriminated that the gasoline vapor is not greater than the predetermined value, the operation is immediately returned to the main routine. On the other hand, when it has been discriminated that the gasoline vapor is greater than the predetermined value, the ECU 22 discriminates whether or not the speed of the vehicle is over 10 km/h in step 102. That is, the ECU 22 discriminates whether or not the vehicle runs based on the vehicle speed. As a result of this discrimination, when it has been discriminated that the vehicle does not run, the process is returned to the main routine in the same manner as the NO result in step 100. In step 102, the threshold value for the discrimination is not restricted to 10 km/h and another parameter can be used as the object to be discriminated, other than the vehicle speed. For example, the revolution speed of the motor 10 can be used. When both the results of the discrimination in step 100 and step 102 are YES, that is, the gasoline vapor amount is large and the vehicle runs, the following step 104 and so forth will be executed.

In step 104, first, the ECU 22 displays the warning "Engine start" on the display device 23 within the vehicle. Of course, a warning by voice or the like can be used. After this warning, that is, informing the driver of the "Engine start", the ECU 22 actuates the engine 14 in step 106. In this step, immediately after the operation start of the engine 14, the engine 14 is in the idling state (the first idle) until the warm up of the engine 14 and the like is finished and the control of an A/F (air-fuel ratio) is started. In this state, the purging of the gasoline vapor is executed by only the purge port 34. That is, only a part of the gasoline vapor generated within the fuel tank, which can not be caught and collected by the charcoal canister 28, is purged onto the upstream side of the throttle valve 32 via the purge port 34. However, this purging is carried out only when the difference between the charcoal canister 28 side and the purge port 34 side is beyond the valve opening value of the check valve 36.

After the execution in step 106, it is discriminated whether or not the revolution speed N of the engine 14 is over 1300 rpm in step 108. In this case, 1300 rpm is the revolution speed of the engine 14 at the first idle. At the first idle or another idle described hereinafter, this discrimination is not made. When the rpm is not greater than 1300 rpm the ECU 22 compares the weight W of the charcoal canister 28 with another predetermined value $W_2$ in step 110. This predetermined value $W_2$ is determined to be smaller than the aforementioned predetermined value $W_1$ used in step 100. As a result of this discrimination, when it has been discriminated that $W > W_2$, that is, the weight of the charcoal canister 28 is not sufficiently reduced, the process is moved to step 106.

After the warm up of the engine 14 and the like is finished and the A/F control is started, the process is moved to either a loaded state operation or an idling according to the SOC of the battery 18 in step 106. That is, when the SOC of the battery 18 is over 80%, the revolution speed of the engine 14 is maintained to a low revolution speed (idling) and the purging of the gasoline vapor is only executed by the purge port 34. In turn, when the SOC of the battery 18 is less than 80%, the operation is moved to the loaded state in order to charge the battery 18. In the case of the SHV, for improving fuel consumption and emission, the revolution speed N of the engine 14 is controlled to a fixed revolution speed, for instance, approximately 2000 rpm in the loaded state.

Hence, in the loaded state operation, the discrimination condition in step 108 is satisfied and the ECU 22 executes step 112. In step 112, the ECU 22 sends the signal to the VSV 40 to form the purging path of the gasoline vapor via the purge port 38. In this situation, the purging of the gasoline vapor is executed by the purge port 38 in addition to the purge port 34. The purge amount of the gasoline vapor is determined by the control (duty ratio control) of the VSV 40 by means of the ECU 22.

The duty ratio of the VSV 40 or the valve opening period of the VSV 40 is decided so that its shift may be small from the target value of the A/F caused due to the purging in a usual gasoline engine vehicle. That is, this valve opening period is determined so that the purging amount of the gasoline vapor may be relatively small with respect to a fuel injection quantity. On the other hand, in the case of the SHV, in order to revolve the engine 14 in the best fuel consumption and emission range, usually, The engine 14 is revolved at the fixed revolution speed and therefore the duty ratio of the VSV 40 becomes the maximum at an early stage. The ECU 22 controls the fuel injection amount such as the A/F=14.6 or the like in addition to the purging.

By repeating such an operation, the purging of the gasoline vapor within the gasoline tank is performed and as a result, at a certain time point, the discrimination condition in step 110 becomes not satisfied. That is, in step 110, it is discriminated that the weight W of the charcoal canister 28 is not greater than the predetermined value $W_2$ and it is considered that the weight of the charcoal canister 28 is sufficiently reduced by the purging. In this case, operations in steps 114 to 118 will be executed. That is, the operation of the engine 14 is continued for a predetermined time period such as 5 minutes in step 114 and the ECU 22 turns off the VSV 40 in step 116 and then stops the engine 14 in step 118. Thereafter, the operation of the ECU 22 is returned to the main routine.

In this embodiment, the reason why step 114 is executed is that the weight of the charcoal containing canister 28 is inevitably varied. That is, if the predetermined value $W_2$ in step 110 is precisely set to a value at which can be deemed that the gasoline vapor is sufficiently purged, there is a possibility that the condition in step 110 can be entirely unsatisfied depending on the variation condition of the weight of the charcoal canister 28. Hence, the predetermined value $W_2$ in step 110 is determined to be rather large up to a certain point. Moreover, the residual gasoline vapor is purged by the continuous operation in step 114. By this operation, the reduction of the vapor amount can be sufficiently performed disregarding the variation of the weight of the charcoal canister 28.

As described above, in this embodiment, the amount of the gasoline vapor caught and collected by the charcoal canister 28, that is, the amount of the gasoline vapor within the gasoline tank can be reduced and thus this gasoline vapor can be prevented from being discharged to the atmosphere. As a result, a lower pollution vehicle can be realized. Furthermore, the remainder of a high polymer component can be prevented by discharging a high volatile component of the gasoline present within the fuel tank and the fixation of the fuel supply system by a gummy component can be prevented. As described above, in this case, various disadvantages caused by the prolonged unoperated state of the engine 14 can be effectively prevented.

In this embodiment, although the continuous operation time in step 114 is set to 5 minutes, it is sufficient to determine it to a time for properly purging the gasoline vapor within the fuel tank. Hence, for example, 10 minutes can be used.

The Second Embodiment

Figure 4:
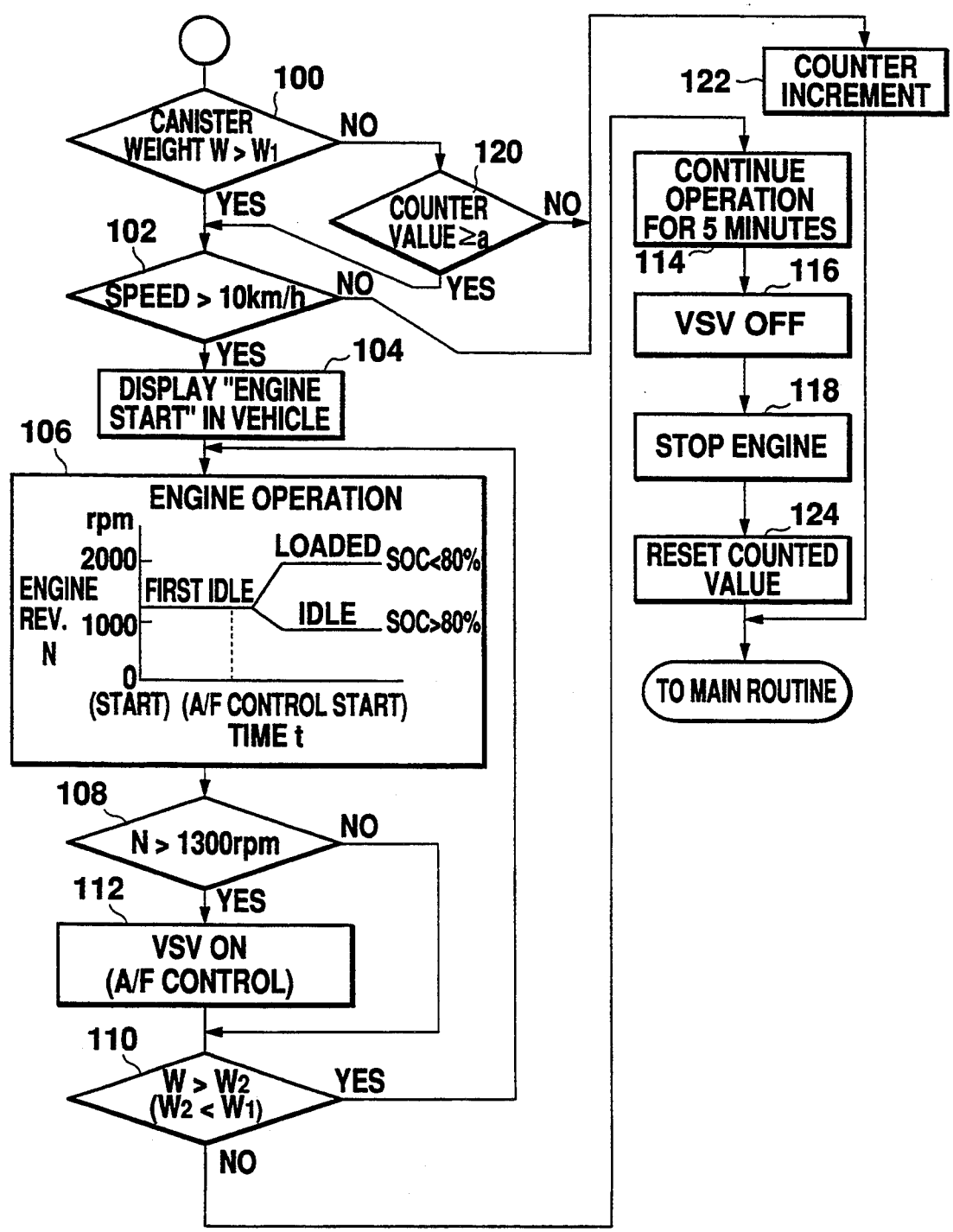

FIG. 4 illustrates a flow of an operation of the ECU 22 in the second embodiment of an engine control apparatus according to the present invention. This embodiment can be carried out by using the same system employed in the above-described first embodiment. In FIG. 4, the same processings as those in the first embodiment are designated by the same symbols and thus description thereof can be omitted for brevity.

In this embodiment, a point of difference from the first embodiment is that a driving distance of the vehicle is used as the condition for actuating the engine 14. That is, when it has been discriminated that the weight W of the charcoal canister 28 is not greater than the predetermined value $W_1$ in step 100, the process is not immediately moved to the main routine but a discrimination regarding an integrating counter indicating the driving distance of the vehicle is executed in step 120. The counter is included within the ECU 22, and only when it has been discriminated that the value of the counter is less than a predetermined value a in step 120, is the process returned to the main routine. However, in this case, before moving to the main routine, another predetermined value is added to the counted value of the counter in step 122. That is, for every execution in step 122, the counter increment is carried out. When the value of the counter is at least the predetermined value a in step 120, the operation is moved to step 102. When the speed of the vehicle is not greater than 10 km/h, the process is moved to the main routine via step 122 in the same manner as the NO result in step 120. In this embodiment, after the execution in step 118, the value counted by the integrating counter is reset in step 124.

Hence, the value of the counter becomes at least the predetermined value a after a certain period passes after the previous execution of step 124. In other words, after step 122 is repeated at least a predetermined number of times after the previous execution of step 106, even if the weight W of the charcoal canister 28 is not beyond the predetermined value $W_1$, step 106 relating to the operation of the engine 14 is executed when the vehicle is in the running state in step 102. In this manner, irrespective of the weight W of the charcoal canister 28, the engine 14 is operated at regular intervals and the reduction of the gasoline vapor amount can be properly performed. Alternatively, under specific circumstances, such as a cold environment or the like, even in the case when it is difficult for the charcoal canister 28 to properly catch and collect the gasoline vapor or in the case of an abnormality in the load cells 30, the engine 14 can be operated at a fixed period.

As described above, in this embodiment, the same effects as those in the first embodiment can be obtained. Also, in this embodiment, the amount of gasoline vapor can be periodically reduced regardless of its amount and thus a vehicle more suited for a cold environment can be realized. Further, even when trouble arises in the load cells 30, the emission and the fuel consumption can be kept at the good values. In this case, in place of steps 120 to 124 relating to the discrimination and counting of the driving distance a discrimination and counting of time can be executed.

The Third Embodiment

Figure 5:
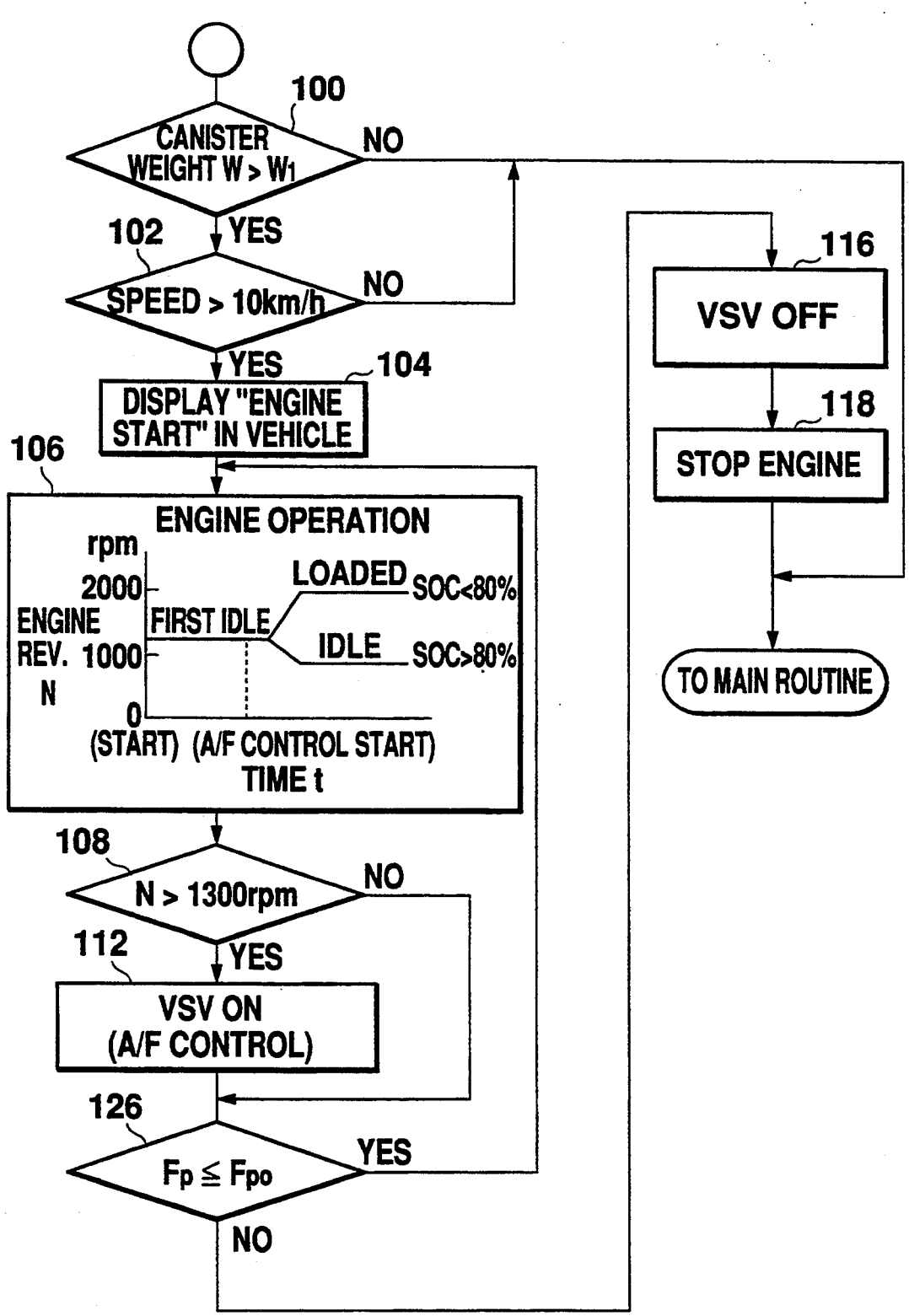

FIG. 5 illustrates a flow of an operation of the ECU 22 in the third embodiment of an engine control apparatus according to the present invention. This embodiment can be carried out by the same system used in the above-described first and second embodiments. In FIG. 5, the same processings as those in the first and second embodiments are designated by the same symbols and thus the description there of can be omitted for brevity.

In this embodiment, step 110 is replaced with new step 126, which is different from the first embodiment. That is, in step 126, in place of the discrimination of the weight W of the charcoal canister 28, a discrimination concerning a purge amount of the gasoline vapor is executed. Also, with this execution, step 114 can be omitted.

In the state that the A/F ratio control is executed, the A/F ratio of the engine 14 is controlled to a predetermined target value such as 14.6 or the like. On the other hand, an intake air amount A is detected and is input to the ECU 22. Hence, a fuel amount F can be obtained by dividing the detected intake air amount A by a predetermined target A/F value. Since the obtained value F is the sum of a fuel injection amount $F_{inj}$ and a purge amount $F_P$, the purge amount $F_P$ can be obtained by a calculation of $F - F_{inj}$. In step 126, it is discriminated whether or not the purge amount $F_P$ is less than or equal to a predetermined value $F_{P0}$. When the purge amount $F_P$ is less than or equal to the predetermined value $F_{P0}$, the ECU 22 moves the operation to step 116 and otherwise returns to step 106.

Therefore, in this embodiment, the same effects as those of the first embodiment can be obtained. Also, it is not necessary to execute the continuous operation of the engine 14 in step 114 after the execution in step 110 in the first embodiment.

The Fourth Embodiment

Figure 6:
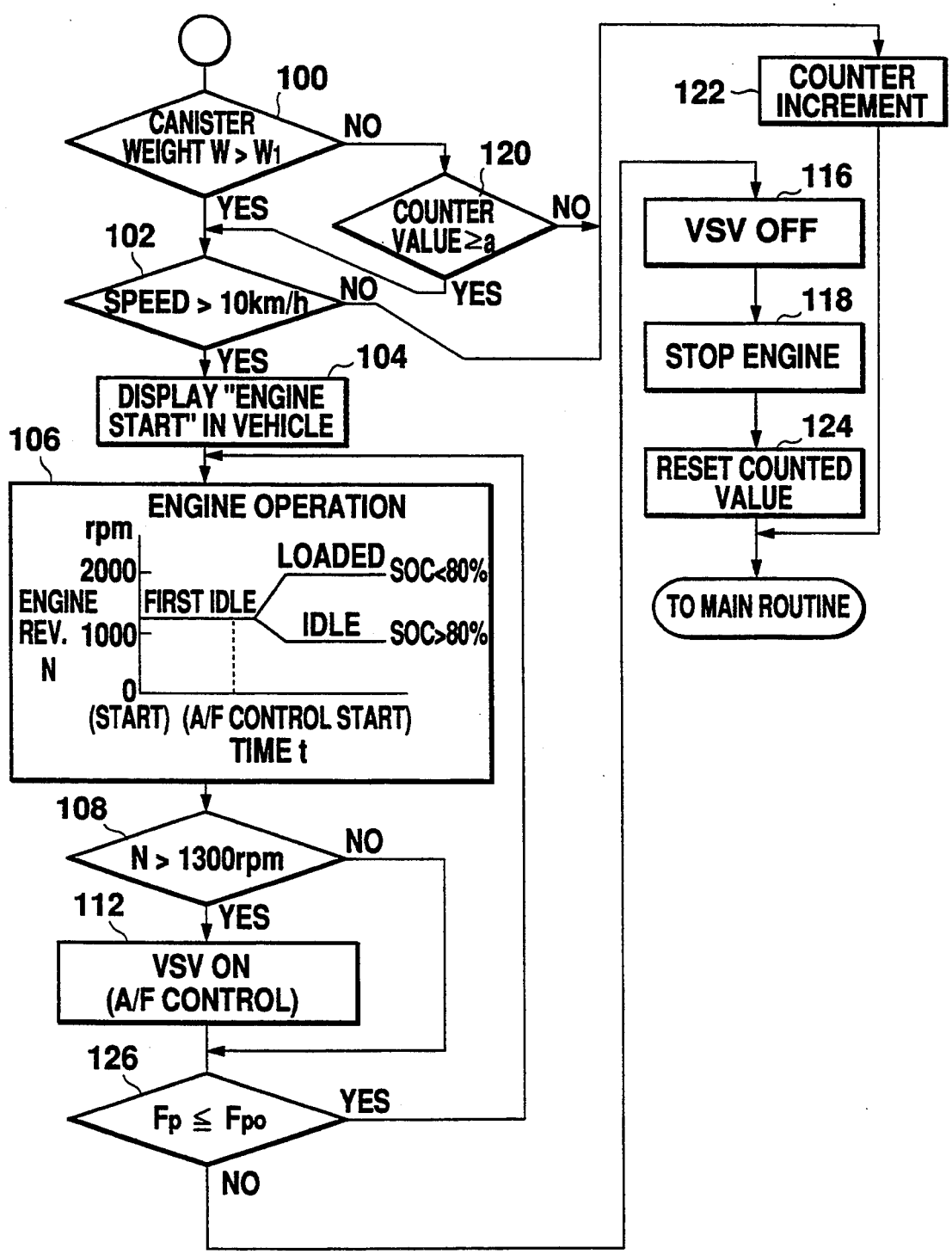
Figure 7:
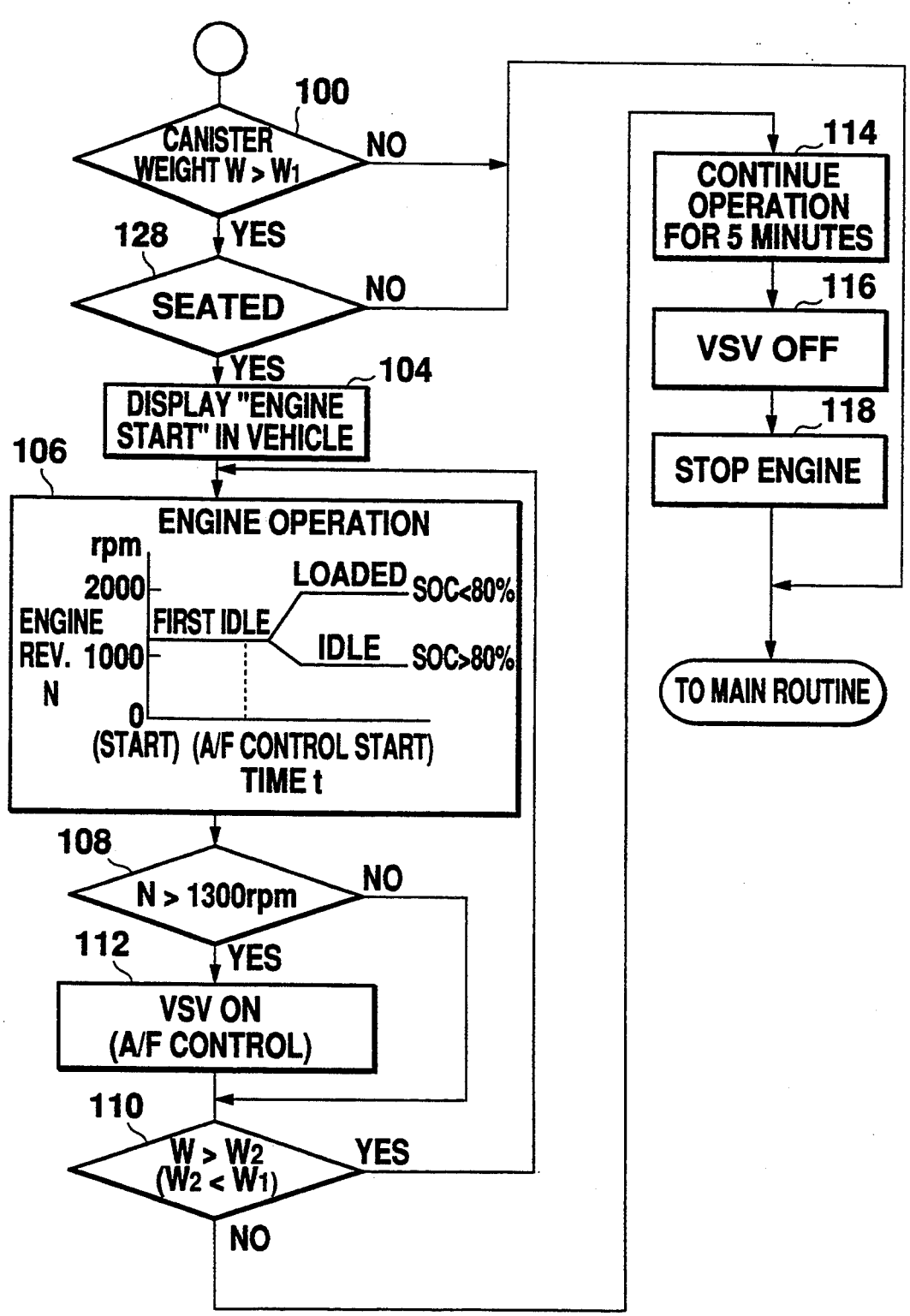
Figure 8:
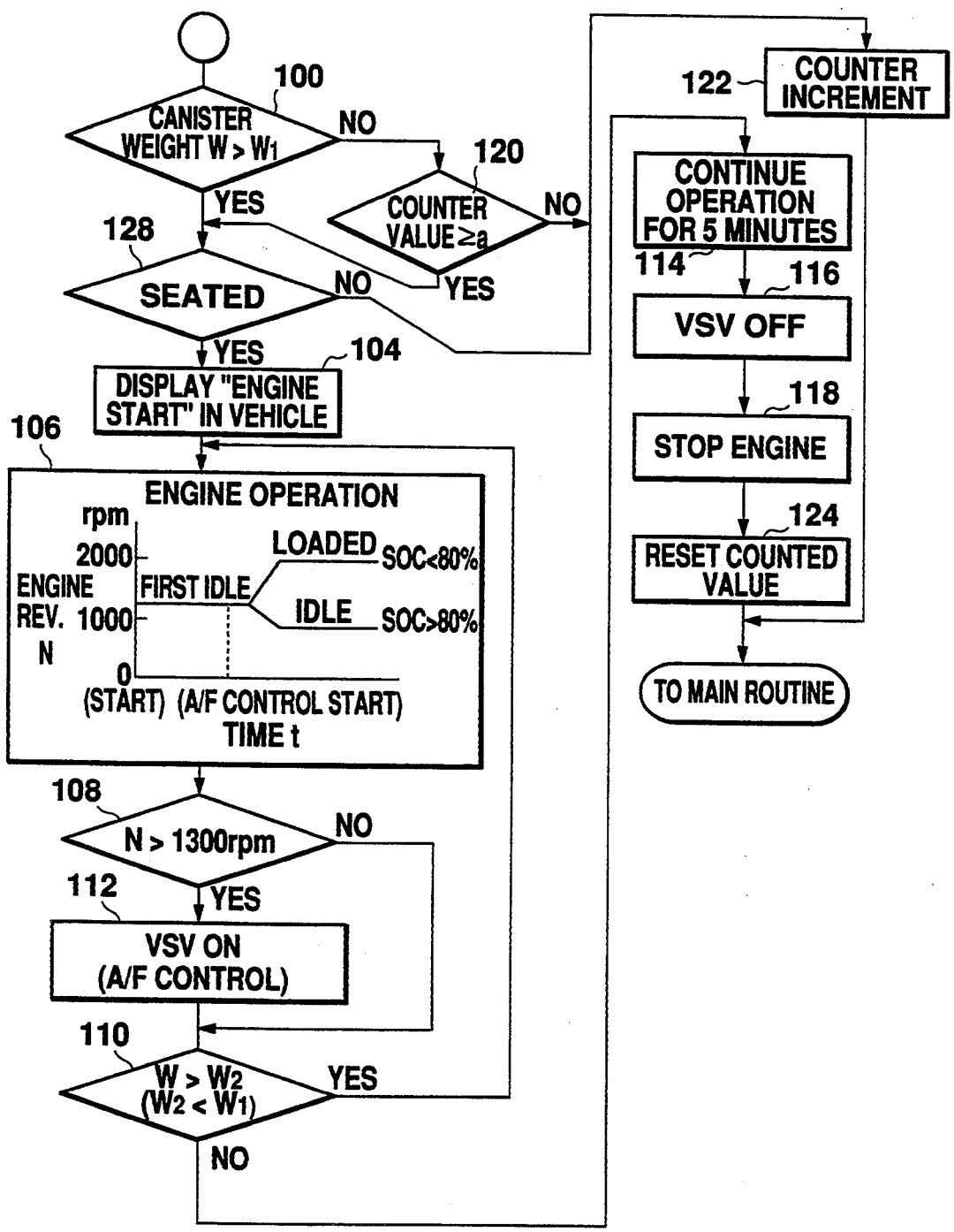
Figure 9:
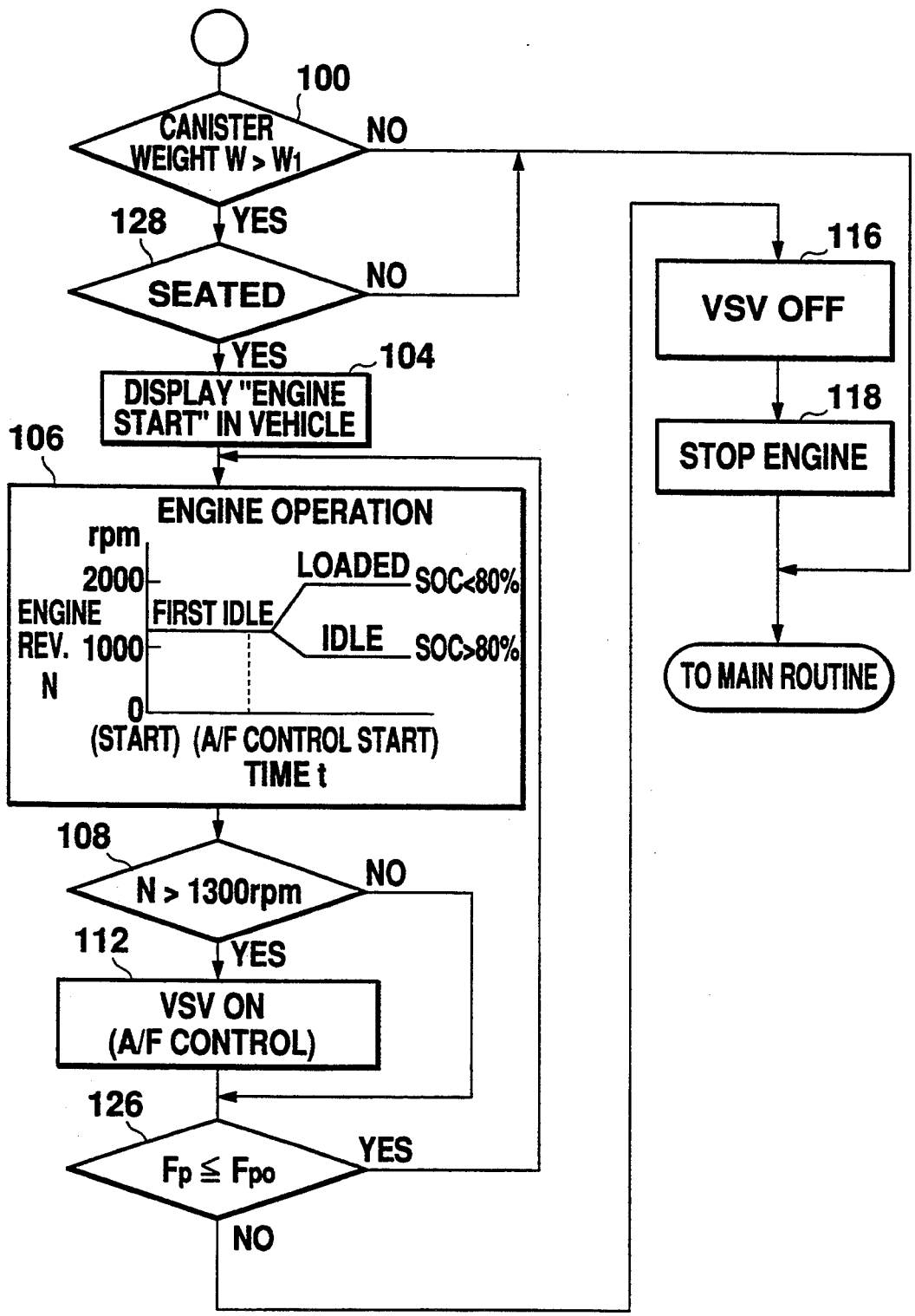
Figure 10:
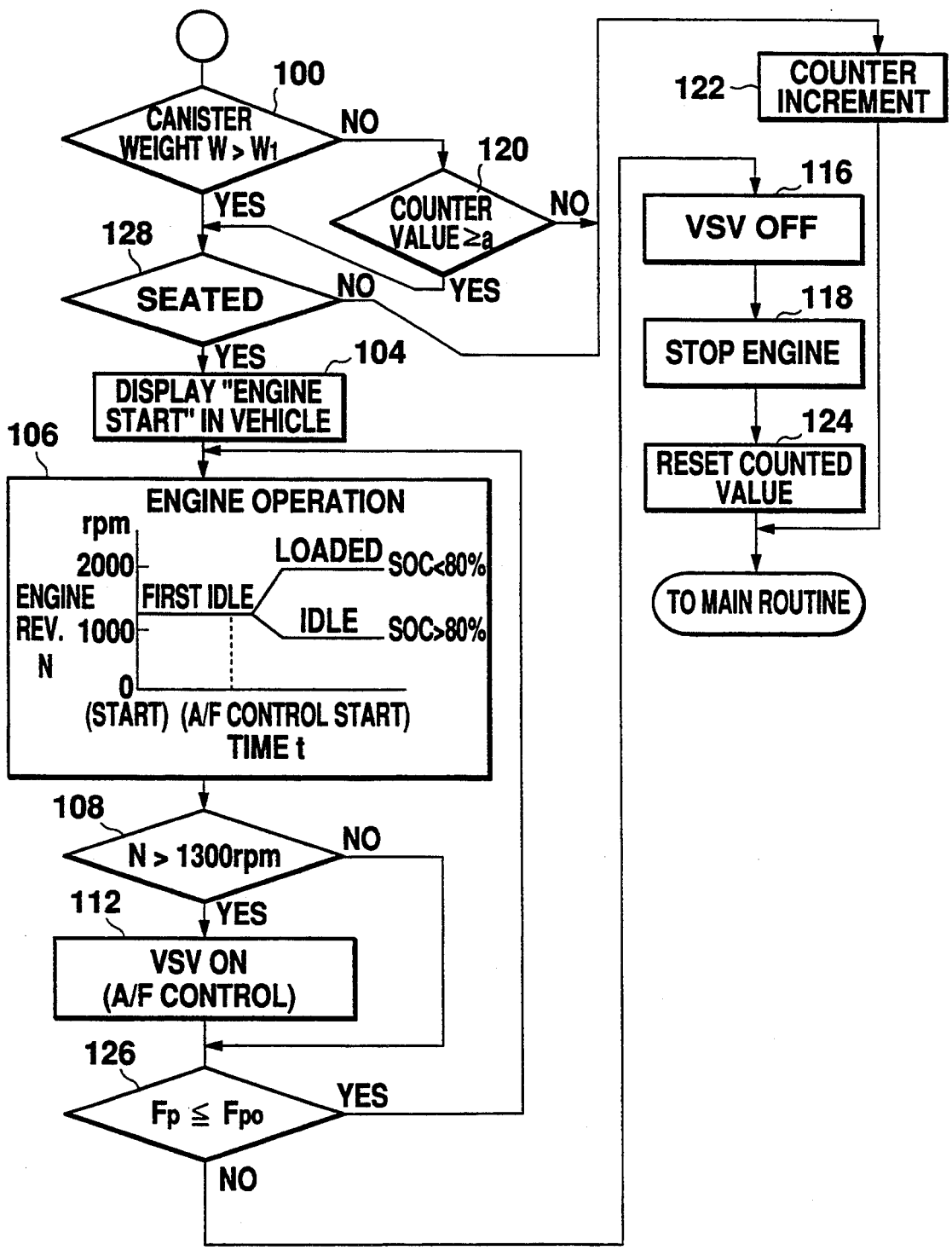

FIG. 6 illustrates a flow of an operation of the ECU 22 in the fourth embodiment of an engine control apparatus according to the present invention. This embodiment can be carried out by the same system used in the above-described first to third embodiments. In FIG. 6, the same processings as those in the first to third embodiments are designated by the same symbols and thus can be omitted for brevity.

In this embodiment, step 110 is replaced with step 126, which is different from the second embodiment. Also, with this change, step 114 can be omitted. Hence, in this embodiment, the same effects as those of both the second and third embodiments can be obtained.

The Fifth to Eighth Embodiments

FIG. 7 to FIG. 10 each illustrate a flow of operation of the ECU 22 in the fifth to eighth embodiments of an engine control apparatus according to the present invention. These embodiment can be carried out by the same system used in the above-described first to fourth embodiments. In FIG. 7 to FIG. 10, the same processings as those in the first embodiment are designated by the same symbols and thus the description there of can be omitted for brevity.

In these embodiments, step 102 is replaced with step 128, which is different from the aforementioned first to fourth embodiments. In step 128, it is discriminated whether or not the vehicle can be run. More specifically, whether or not the driver is actually seated on a driver's seat is discriminated by the ECU 22 based on vehicle signals. When the discrimination is satisfied or the result is YES, the operation is moved to step 104, and when the discrimination is not satisfied or the result is NO, the operation is moved to step 122 or the main routine. Therefore, in these embodiments, the same effects as those of the first to fourth embodiments can be obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method of controlling an engine for driving a generator, comprising the steps of:
    detecting an amount of fuel vapor within a fuel tank in an engine stopped;
    starting a loaded operation of the engine by using fuel stored within the fuel tank when the detected amount of fuel vapor in the engine stopped state is over a first predetermined value;
    detecting an amount of fuel vapor within the fuel tank in an engine operated state; and
    stopping the engine when the detected amount of fuel vapor in the engine operated state is less than or equal to a second predetermined value which is smaller than the first predetermined value.

2. The method of claim 1, wherein the engine and the generator are mounted on an electric vehicle driven by a motor and wherein the generator converts an input from the engine into electric power and the obtained electric power is supplied to the motor for driving the motor.

3. The method of claim 2, wherein the loaded operation of the engine is started when the vehicle runs.

4. The method of claim 3, wherein, when a vehicle speed is larger than or equal to a predetermined value, the vehicle is considered to run.

5. The method of claim 2, wherein the loaded operation of the engine is started when the vehicle is in a runnable state.

6. The method of claim 5, wherein, when a driver is actually seated on a driver's seat, the vehicle is considered to be in the runnable state.

7. The method of claim 2, wherein the loaded operation of the engine is executed at a fixed period.

8. The method of claim 2, wherein an engine start is informed to a driver prior to a start of the loaded operation of the engine.

9. The method of claim 1, wherein the amount of fuel vapor within the fuel tank is detected as a weight of a charcoal canister for catching and collecting the fuel vapor within the fuel tank.

10. The method of claim 1, wherein the loaded operation of the engine is executed for a predetermined time in a period till the engine is stopped after the detected amount of fuel vapor becomes less than or equal to the second predetermined value.

11. The method of claim 1, wherein an idle operation of the engine is executed in a period till the loaded operation of the engine is started after the detected amount of the fuel vapor becomes greater than the first predetermined value.

12. The method of claim 11, wherein when the detected amount of fuel vapor is greater the first predetermined value, the idle operation of the engine is executed when there is no generating request for the generator.

13. The method of claim 12, wherein a generated power of the generator is used to charge a battery and the generating request is a poor charged state of the battery.

14. The method of claim 1, wherein the engine includes:
a first purge port for purging the fuel from the fuel tank to an air intake system when the first purge is open when a pressure difference between the fuel tank and the air intake system is large; and
a second purge port for purging the fuel from the fuel tank to the air intake system when the second purge port is open in response to a control signal.

15. The method of claim 14, wherein, when the loaded operation of the engine is executed, a ratio between a fuel amount and an air amount to be supplied to the engine is controlled to be a predetermined target value by injecting the fuel into the engine while the air amount supplied to the engine is detected.

16. The method of claim 15, wherein the control of the ratio between the fuel amount and the air amount is executed by supplying the control signal to the second purge port.

17. The method of claim 15, wherein, when the fuel vapor amount within the fuel tank is detected in the engine operated state, an actual fuel amount supplied to the engine is calculated by dividing the detected air amount by the predetermined target value and a purge amount of the fuel via the path is calculated by subtracting the fuel amount injected into the engine from the calculated fuel amount and wherein the calculated purge amount is considered as the fuel vapor amount within the fuel tank.

18. An apparatus for controlling an engine driving a generator, comprising:
means for detecting an amount of fuel vapor within a fuel tank in an engine stopped state;
means for starting a loaded operation of the engine by using a fuel stored within the fuel tank when the detected amount of the fuel vapor in the engine stopped state is over a first predetermined value;
means for detecting an amount of the fuel vapor within the fuel tank in an engine operated state; and
means for stopping the engine when the detected amount of fuel vapor in the engine operated state is less than or equal to a second predetermined value which is smaller than the first predetermined value.

* * * * *

UNITED STATES PATENT AND TRADEMARK OFFICE
CERTIFICATE OF CORRECTION

PATENT NO.   : 5,371,412
DATED        : December 6, 1994
INVENTOR(S)  : Yoshihiro IWASHITA, et al.

It is certified that error appears in the above-indentified patent and that said Letters Patent is hereby corrected as shown below:

On the title page, Item [75], the second inventor's name is listed incorrectly. It should read:

--Hirofumi Kubota--

Signed and Sealed this

Fourth Day of April, 1995

Attest:

BRUCE LEHMAN

*Attesting Officer*     *Commissioner of Patents and Trademarks*